United States Patent

Yamamoto

(10) Patent No.: US 10,691,160 B2
(45) Date of Patent: *Jun. 23, 2020

(54) FORWARD/BACKWARD MOVEMENT DEVICE

(71) Applicant: HI-LEX CORPORATION, Hyogo (JP)

(72) Inventor: Nobuyuki Yamamoto, Iwate (JP)

(73) Assignee: HI-LEX CORPORATION, Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/306,047

(22) PCT Filed: May 24, 2017

(86) PCT No.: PCT/JP2017/019298
§ 371 (c)(1),
(2) Date: Nov. 30, 2018

(87) PCT Pub. No.: WO2017/208915
PCT Pub. Date: Dec. 7, 2017

(65) Prior Publication Data
US 2019/0294198 A1 Sep. 26, 2019

(30) Foreign Application Priority Data

May 31, 2016 (JP) .................. 2016-108995

(51) Int. Cl.
G05G 5/06 (2006.01)
B60K 15/05 (2006.01)
(Continued)

(52) U.S. Cl.
CPC ............. G05G 5/06 (2013.01); B60K 15/05 (2013.01); E05B 83/34 (2013.01); E05C 19/02 (2013.01);
(Continued)

(58) Field of Classification Search
CPC ...... G05G 5/06; G05G 2505/00; E05C 19/22; E05B 81/06; E05B 81/14; E05B 83/34;
(Continued)

(56) References Cited

U.S. PATENT DOCUMENTS

2014/0084599 A1 3/2014 Beck
2014/0251036 A1 9/2014 Ishiguro
(Continued)

FOREIGN PATENT DOCUMENTS

DE 102011101838 A1 11/2012
EP 2087192 8/2009
(Continued)

OTHER PUBLICATIONS

International Search Report from International Application No. PCT/JP2017/019298 dated Jul. 11, 2017.
Extended European Search Report dated Jan. 29, 2020.

Primary Examiner — Thomas C Diaz
(74) Attorney, Agent, or Firm — Brundidge & Stanger, P.C.

(57) ABSTRACT

In a forward/backward movement device, a forward/backward member moves so as to move forward or backward while rotating relative to the case; a restriction member is provided so as to be capable of moving between a restriction position for restricting the forward/backward member, and a release position for releasing the restriction, and restricts the forward/backward member by engaging a forward/backward member-side member in the restriction position; a drive unit is provided on the same side as is the forward/backward position control mechanism relative to the restriction member and the forward/backward member; and the drive shaft extends so as to include the direction in which the forward/backward member extends as a directional component.

3 Claims, 8 Drawing Sheets

(51) Int. Cl.
  *E05B 83/34*   (2014.01)
  *E05C 19/02*   (2006.01)
(52) U.S. Cl.
  CPC .. *B60K 2015/0515* (2013.01); *G05G 2505/00* (2013.01)
(58) Field of Classification Search
  CPC .......... E05B 81/28; E05B 81/30; E05B 81/36; B60K 15/05
  See application file for complete search history.

(56) References Cited

U.S. PATENT DOCUMENTS

2016/0348408 A1    12/2016  Watanabe
2017/0043660 A1*   2/2017   Horikawa ............... B60K 15/05

FOREIGN PATENT DOCUMENTS

| EP | 3255230 A1 | 12/2017 | |
| FR | 3016854 A1 * | 7/2015 | ........... E05C 19/022 |
| JP | 2014-173422 A | 9/2014 | |
| JP | 2017-043939 A | 3/2017 | |
| WO | 2008/059543 A1 | 5/2008 | |
| WO | 2015105193 A1 | 7/2015 | |

\* cited by examiner

FORWARD/BACKWARD MOVEMENT DEVICE

TECHNICAL FIELD

The present invention relates to a forward/backward movement device including a case and a forward/backward member capable of moving forward and backward with respect to the case.

BACKGROUND ART

Fuel lids that cover refueling ports in vehicles, such as automobiles, have been known. The fuel lids are typically attached to vehicle bodies via hinges. For example, Patent Literature (hereinafter, referred to as "PTL") 1 discloses an opening and closing apparatus that causes a shaft-shaped pushrod (plunger) to move forward and backward in an axial direction of the pushrod to open and close the fuel lid. The pushrod moves forward and backward between a pushed-in position where the fuel lid is closed and a pushed-out position where the fuel lid is opened, and rotates in a rotational direction about an axis of the pushrod while moving forward or backward. A distal end of the push rod is provided with a lid securing portion, and the fuel lid is provided with a secured portion. When the pushrod is located in the pushed in position, the lid securing portion secures the secured portion of the fuel lid. A closed state in which the fuel lid covers the refueling port is thus set. During the forward movement of the pushrod toward the protruding position, the pushrod and the lid securing portion rotate to release the secured state between the latching section and the latched section of the fuel lid, so that the refueling port having covered the fuel lid is open.

The opening and closing apparatus in PTL 1 has a locking mechanism that locks the forward/backward movement of the pushrod (FIG. 11 and FIG. 12 in PTL 1). The locking mechanism drives a motor to cause a securing member to secure the pushrod to regulate moving forward or backward of the pushrod. When the locking mechanism regulates moving forward or backward of the pushrod, the pushrod does not move forward or backward even when the fuel lid is operated, and thus, the state of the fuel lid does not turn into the open state from the closed state.

CITATION LIST

Patent Literature

PTL 1
Japanese Patent Application Laid-Open No. 2014-173422

SUMMARY OF INVENTION

Technical Problem

In recent years, further reduction in weight and size of a vehicle has been required. To this end, reduction in the size of the forward/backward movement device usable in the fuel rid opening and closing apparatus is also required.

An object of the present invention is to provide a compact forward/backward movement device that causes a forward/backward member to move forward/backward.

Solution to Problem

A forward/backward movement device of the present invention includes:

a case;

a forward/backward member capable of moving forward and backward with respect to the case;

a forward/backward movement position control mechanism that performs control such that the forward/backward movement member moves forward to a forward position where the forward/backward member moves forward with respect to the case and moves backward to a backward position where the forward/backward member moves backward with respect to the case;

a restriction member that causes the forward/backward member to be in a restricted state in which the forward and backward movement is restricted;

a drive section including a drive shaft and a main body that rotates the drive shaft; and a driving-force transmission member that is connected to one end of the drive shaft and transmits a driving force of the drive section to the restriction member to move the restriction member, in which the forward/backward member is provided in the case so as to move forward and backward while rotating relatively with respect to the case, the forward/backward position control mechanism includes a case-side member provided in a predetermined position with respect to the case, and a forward/backward-member-side member provided in the forward/backward member so as to fit to the forward/backward member such that the forward/backward-member-side member is rotatable relatively with respect to the forward/backward member, the restriction member is provided so as to be movable to a restricted position where the restriction member causes the forward/backward member to be in the restricted state and to a releasing position where the restricted state is released, the restriction member causing the forward/backward member to be in the restricted state by engaging with the forward/backward-member-side member in the restricted position, the drive section is provided on a side identical to a side where the forward/backward position control mechanism is provided with respect to the restriction member and the forward/backward member, and the drive shaft extends in a direction including, as a direction component, a direction in which the forward/backward member extends.

Advantageous Effects of Invention

According to the present invention, a compact forward/backward movement device can be provided.

DESCRIPTION OF EMBODIMENTS

An embodiment of the present invention will be described below in detail with reference to the accompanying drawings.

A forward/backward movement device according to the present embodiment causes a forward/backward member to moves forward and backward with respect to a case. Although a fuel lid opening/closing apparatus is presented as one application example, the forward/backward movement device according to the present embodiment may be applied to an apparatus different from a fuel lid opening/closing apparatus.

[Opening/Closing Apparatus 100 in which Forward/Backward Movement Device 1 is Applied]

Figure 1:
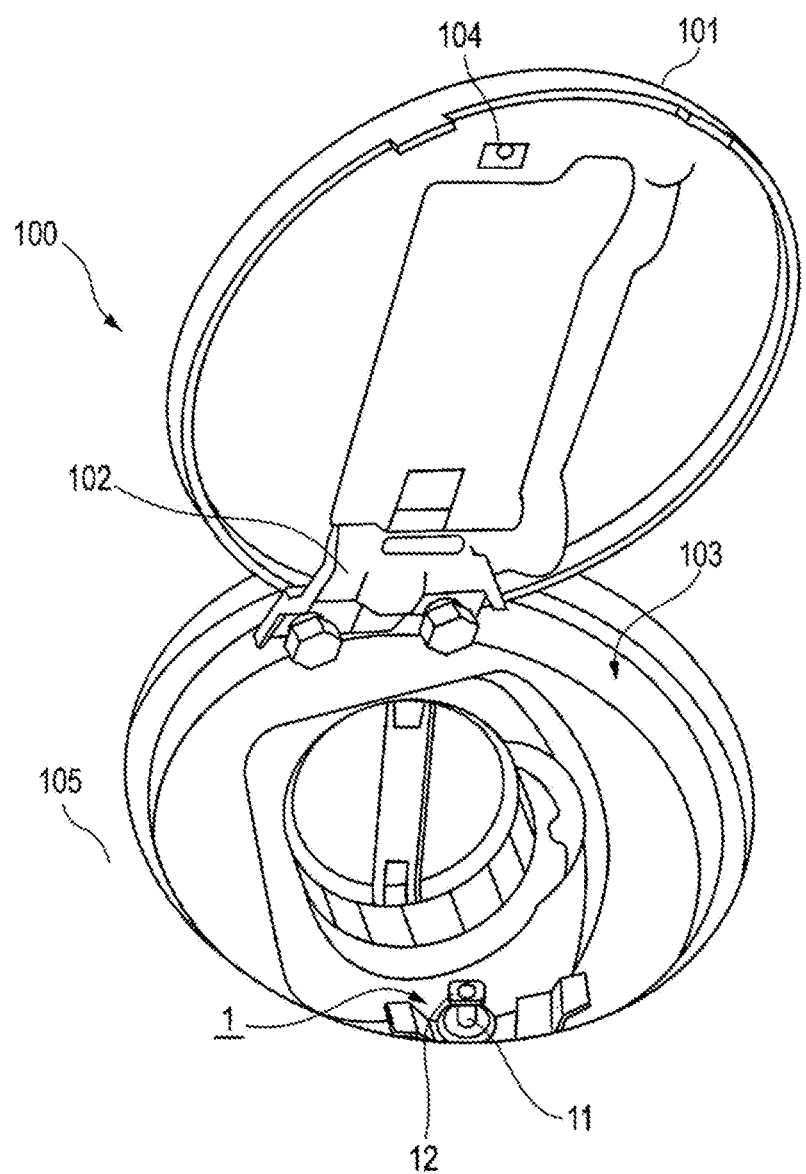
FIG. 1 is a perspective view illustrating a configuration in which a forward/backward movement device according to an embodiment of the present invention is used in a fuel lid opening/closing apparatus.

As illustrated in FIG. 1, opening/closing apparatus 100 is an apparatus that opens and closes a lid for closing an opening that houses a fueling port of a vehicle, and forward/backward movement device 1 according to the present embodiment is applied to opening/closing apparatus 100. Opening/closing apparatus 100 includes: opening 103 provided in vehicle body 105; fuel lid 101 which is a lid that covers opening 103; hinge 102 which pivotably supports fuel lid 101; and forward/backward movement device 1.

Forward/backward movement device 1 includes forward/backward member 11, and latching section 12 which is provided at a leading end of forward/backward member 11, and forward/backward member 11 moves forward and backward to open and close fuel lid 101.

Fuel lid 101 is provided with latched section 104 on to which latching section 12 of forward/backward member 11 can be latched. Latched section 104 is, for example, a hole having an opening through which latching section 12 can pass when latching section 12 is in a predetermined angular position.

Figure 2:
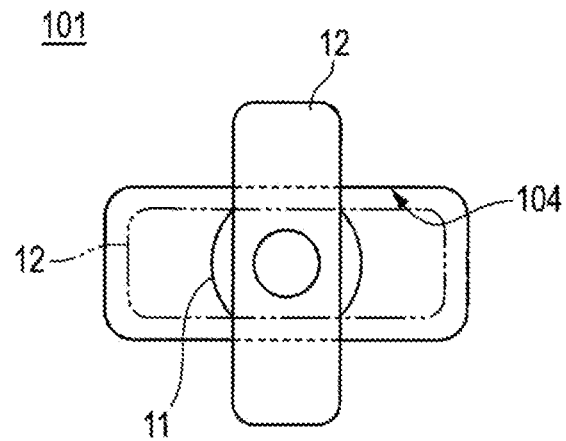
FIG. 2 describes the relationship between a latching section of a forward/backward member and a latched section of a fuel lid.

According to opening/closing apparatus 100 configured in the manner described above, when fuel lid 101 is closed, fuel lid 101 pushes forward/backward member 11, and forward/backward member 11 moves backward toward the interior of vehicle body 105. When fuel lid 101 is closed and comes into contact with latching section 12, latching section 12 of forward/backward member 11 is in the predetermined angular position (see latching section 12 illustrated with imaginary line in FIG. 2) and therefore passes through the opening of latched section 104 and enters latched section 104. Further, when forward/backward member 11 moves backward, latching section 12 located in latched section 104 rotates and the angle of latching section 12 changes (see latching section 12 illustrated with solid line in FIG. 2), and thus, latching section 12 latches latched section 104. When latching section 12 latches latched section 104, closed fuel lid 101 is locked.

When fuel lid 101 is pushed in the state in which opening 103 is closed by fuel lid 101, an energization force acts on forward/backward member 11, and forward/backward member 11 moves forward outward beyond vehicle body 105. At this time, when latching section 12 of forward/backward member 11 rotates and the angular position of latching section 12 becomes the predetermined angular position, latching between latching section 12 and latched section 104 is released. Thus, action for fuel lid 101 to open is made.

Although details will be given later, in a restricted state in which the forward/backward movement of forward/backward movement device 1 is restricted, and when fuel lid 101 is closed, further pushing of fuel lid 101 causes no energizing force that causes forward/backward member 11 to move forward outward beyond vehicle body 105 to act on forward/backward member 11. Thus, fuel lid 101 does not open.

[Overall Configuration of Forward/Backward Movement Device 1]

Figure 3:
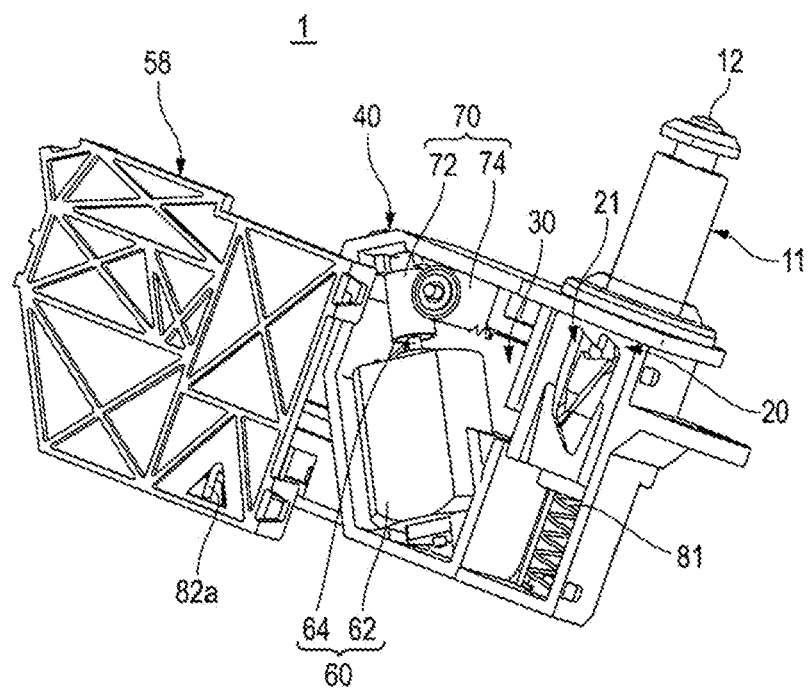
FIG. 3 is a separation perspective view illustrating a case and a cover in the forward/backward movement device according to the embodiment of the present invention.
Figure 4:
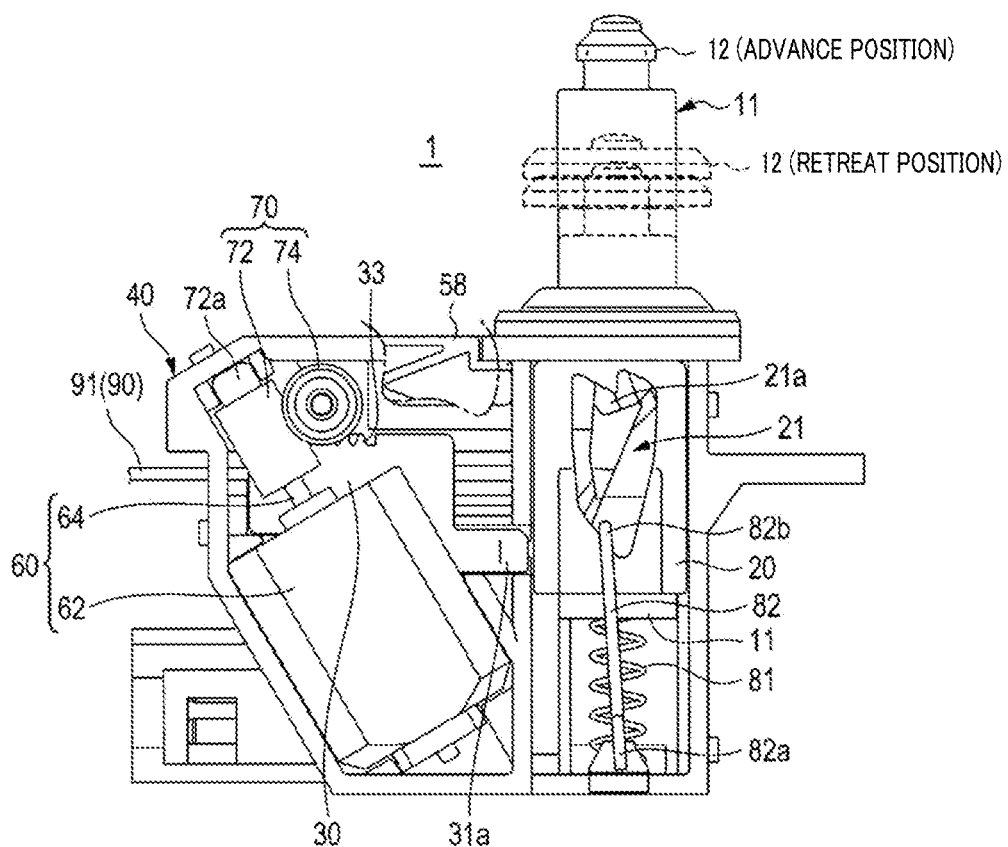
FIG. 4 is a front view illustrating a state in which the cover is removed and the forward/backward member moves forward to a forward position in the forward/backward movement device according to the embodiment of the present invention.

Forward/backward movement device 1 includes forward/backward member 11, case 40, a forward/backward position control mechanism, restriction member 30, drive section 60, and driving-force transmission member 70, as illustrated in FIGS. 3 and 4 and/or the like. In the present embodiment, forward/backward movement device 1 further includes spring 81 as an energizing member, cover 58, and cable 90. The forward/backward position control mechanism includes forward/backward-member-side member 20, and pin 82 as an example of a case-side member.

[Case 40]

Case 40 includes a plurality of holding sections that hold components, such as forward/backward member 11, forward/backward-member-side member 20, restriction member 30, drive section 60, driving-force transmission member 70, and spring 81 as illustrated in FIG. 3. Case 40 has an opening covered with cover 58. Case 40 houses components such as forward/backward member 11 and/or the like and is positioned with respect to fuel lid 101.

Figure 6:
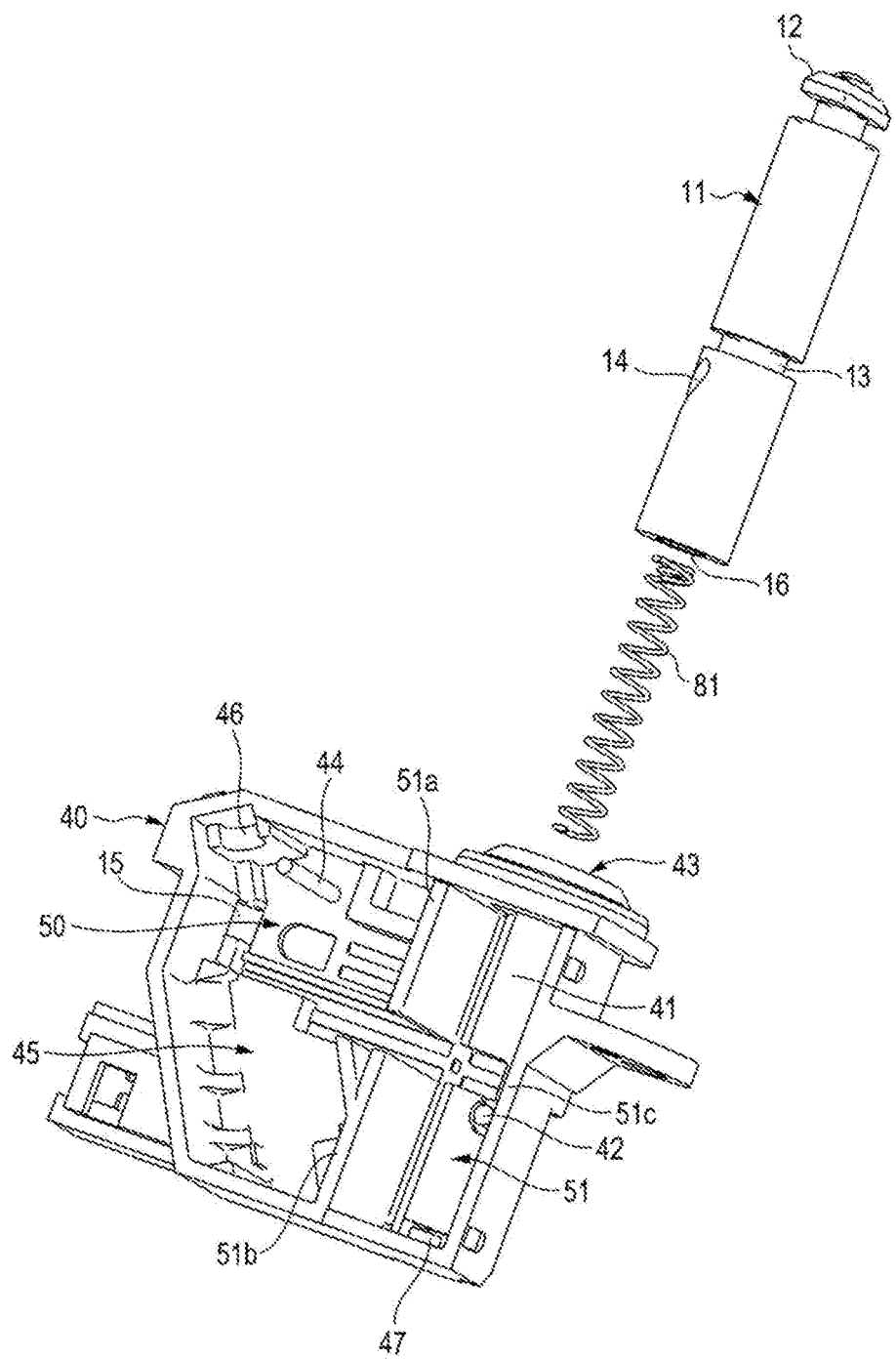
FIG. 6 is a perspective view in which the forward/backward member is separated from the case in the forward/backward movement device according to the embodiment of the present invention.

One surface of case 40 is provided with through hole 43 through which part of forward/backward member 11 passes so that forward/backward member 11 can move forward and backward with respect to case 40, as illustrated in FIG. 6. A holding section (details will be given later) is formed in case 40. The holding section holds components, such as forward/backward member 11 and restriction member 30, with an opening as an upper portion, a bottom portion, and a wall-shaped portion that stands on the bottom portion.

Case 40 is further provided with lead-out hole 15 through which cable 90 connected to restriction member 30 is led out.

Case 40 is provided with: first holding section 41 which holds forward/backward member 11 movably in a predetermined direction; third holding section 50 which slidably holds restriction member 30; and second holding section 51 which slidably holds part of forward/backward-member-side member 20. Case 40 is further provided with: spindle 44 which rotatably supports worm 74; bearing 46 which supports shaft section 72a of worm gear 72; drive-section main-body holding section 45 which holds drive section main body 62 of drive section 60, and spring holding shaft 47. Forward/backward member 11 and forward/backward-member-side member 20 provided on the side facing the forward/backward member are allowed to move with no looseness with respect to case 40 by first holding section 41 and second holding section 51, and thus, movement regulation in a predetermined position can be reliably performed by the restriction member held by third holding section 50.

[Forward/Backward Member 11]

Forward/backward member 11 is a member capable of moving forward and backward with respect to case 40. Specifically, forward/backward member 11 is movable to a forward position to which forward/backward member 11 moves forward and a backward position to which forward/backward member 11 moves backward. The term "move forward" or "forward" used herein means that forward/backward member 11 moves toward the exterior of case 40, and the term "move backward" or "backward" used herein means that forward/backward member 11 moves toward the interior of case 40. The forward position is the position where forward movement of forward/backward member 11 stops, and the backward position is the position where backward movement of forward/backward member 11 stops. Therefore, in a case where the forward position and the backward position are both in the exterior of case 40, for example, as in the present embodiment, a specific portion of forward/backward member 11, for example, the leading end of forward/backward member 11 is farther away from case 40 in the forward position than in the backward position. In opening/closing apparatus 100 (see FIG. 1), the forward position is a position where latching section 12 does not latch latched section 104 of fuel lid 101 and fuel lid 101 is therefore open. In opening/closing apparatus 100, the backward position is a position where latching section 12 latches latched section 104 of fuel lid 101 and fuel lid 101 is therefore held in the closed state.

As a variation, it is conceivable that the forward position and the backward position are both in the interior of case 40. In this case, a specific portion of forward/backward member 11, for example, the leading end of forward/backward member 11 is closer to the outer side of case 40 in the forward position than in the backward position. It is further conceivable that the forward position is in the exterior of case 40 and the backward position is in the interior of case 40. In this case, a specific portion of forward/backward member 11, for example, the leading end of forward/backward member 11 extends to the outside of case 40.

Forward/backward member 11 is provided in case 40 so as to move forward and backward while rotating relatively to case 40.

In the present embodiment, forward/backward member 11 includes a circular columnar or cylindrical rod part and latching section 12 provided at the leading end of the rod part. In the present embodiment, forward/backward member 11 is disposed such that the axial direction of forward/backward member 11 coincides with the direction in which forward/backward member 11 moves forward and backward (forward direction and backward direction). Annular groove 13 is formed on a part of the rod in an axial direction. Annular groove 13 is an example of a fit section into which forward/backward-member-side member 20 to be described later fits such that they are rotatable relatively to each other. Further, helical groove 14 is formed on a part of the rod, on the backward side from annular groove 13. Annular groove 13 is provided along the outer circumference of the rod part so as to be perpendicular to the axis of forward/backward member 11. Annular groove 13, which is the fit section, is provided so as to prevent forward/backward-member-side member 20 from hindering the restriction imposed by restriction member 30 when forward/backward member 11 rotates around the axis thereof and forward/backward-member-side member 20 is displaced accordingly.

Forward/backward member 11 passes through through-hole 43 of case 40 and is slidably held by first holding section 41 of case 40. First holding section 41 is provided with a wall surface that holds forward/backward member 11, and the wall surface is provided with protrusion 42. Forward/backward member 11 is disposed such that protrusion 42 on the bottom-side wall surface of case 40 is inserted into helical groove 14. Note that, the bottom side of case 40 corresponds to the side of case 40 which is opposite to the side where cover 58 is attached. The movement of forward/backward member 11 in the direction perpendicular to the axial direction thereof is restricted by forward/backward-member-side member 20 (see FIG. 3), cover 58, and the wall surface of case 40, and thus, falling off of protrusion 42 from helical groove 14 is suppressed. Therefore, when forward/backward member 11 moves in the forward/backward direction, protrusion 42 restrains the position of forward/backward member 11 in the circumferential direction of helical groove 14, and thus, forward/backward member 11 rotates around the axis thereof. That is, forward/backward member 11 moves forward and backward while rotating around the axis thereof, as an example of forward/backward movement along with rotation with respect to case 40.

Protrusion 42 of first holding section 41 and helical groove 14 in forward/backward member 11 form a mechanism that causes forward/backward member 11 to move forward and backward while rotating relatively to case 40. Helical groove 14 in forward/backward member 11 is an example of a trajectory guiding section that guides forward/backward member 11 along the trajectory of the rotational movement of forward/backward member 11, and protrusion 42 of first holding section 41 is an example of a trajectory guided section guided by the trajectory guiding section. As a variation, first holding section 41 may be provided with a trajectory guiding section, such as a helical groove, and forward/backward member 11 may be provided with a trajectory guided section, such as a protrusion. That is, it is possible to employ a configuration in which one of case 40 and forward/backward member 11 includes a trajectory guiding section that guides the movement trajectory of forward/backward member 11 with forward/backward member 11 moving forward and backward while rotating with respect to case 40, and the other one of case 40 and forward/backward member 11 includes a trajectory guided section guided by the trajectory guiding section.

In the present embodiment, as an example of the behavior of forward/backward member 11, which moves forward and backward while rotating relatively to case 40, continuous rotation of forward/backward member 11 that accompanies forward/backward movement has been presented, and another behavior is also conceivable. For example, the behavior of forward/backward member 11 may be temporary rotation or intermittent rotation at the time of start or end of the forward/backward movement in the process of the forward/backward movement of forward/backward member 11.

Forward/backward member 11 includes a holding section that holds one end of spring 81. An example of the holding section is spring insertion hole 16 formed in the rod part on a backward-direction-side. In the description, spring insertion hole 16 is coaxial with the center axis of forward/backward member 11. The inner diameter of spring insertion hole 16 is a diameter that allows, when spring 81 is compressed, compressed spring 81 to be housed. The structure that attaches spring 81 to forward/backward member 11 is not particularly limited as long as spring 81 can energize forward/backward member 11. Since spring 81 is coaxial with forward/backward member 11, the configuration of the forward/backward movement device can be compact as compared with a case where spring 81 is disposed so as to be parallel to the center axis of forward/backward member 11 and located in a position shifted from the center axis, because the space corresponding to the amount of shift from the center axis does not need to be provided.

[Spring 81]

Spring 81 energizes forward/backward member 11 in the axial direction of forward/backward member 11, in particular, in the forward direction of forward/backward member 11. Spring 81 has one end inserted into spring insertion hole 16 of forward/backward-member-side member 20 and the other end held by single spring holding shaft 47 of case 40, as illustrated in FIG. 6. Thus, spring 81 exerts a repulsive force in the forward direction of forward/backward member 11 on forward/backward member 11 and forward/backward-member-side member 20 which moves along with forward/backward member 11. The forward movement of forward/backward member 11 energized in the forward direction by spring 81 is regulated when forward/backward-member-side member 20, which fits in a relatively rotatable manner in case 40, comes into contact with the inner peripheral wall surface around through hole 43 (details will be given later).

[Forward/Backward Position Control Mechanism]

The forward/backward position control mechanism is a mechanism that performs control such that forward/backward member 11 moves forward to the forward position where forward/backward member 11 moves forward with respect to case 40 and moves backward to the backward position where forward/backward member 11 moves backward with respect to case 40. The forward/backward position control mechanism includes the case-side member provided in a predetermined position relative to case 40 and forward/backward-member-side member 20 provided on forward/backward member 11 so as to fit into forward/backward member 11 such that they are rotatable relatively to each other. The forward/backward position control mechanism has a movement function of moving forward/backward member 11 in the forward/backward direction and a stop function of stopping forward/backward member 11 in the forward position or the backward position. Since the movement of forward/backward member 11 in the forward/backward direction, the v position to which forward/backward member 11 moves forward, and the backward position to which forward/backward member 11 moves backward are both determined by the relative positional relationship with case 40, the forward/backward position control mechanism includes a portion provided on case 40 (that is, case-side member) and a portion provided on forward/backward member 11 (that is, forward/backward-member-side member 20) that are each configured to reliably control the positional relationship. These sections are both disposed in case 40. In the present embodiment, pin 82 is used as an example of the case-side member.

[Forward/Backward-Member-Side Member 20]

Forward/backward-member-side member 20 illustrated in FIG. 3, FIG. 4, FIG. 7, and FIG. 8 is provided as part of forward/backward member 11 while fitting into forward/backward member 11 such that they are rotatable relatively to each other. Forward/backward-member-side member 20 moves along with forward/backward member 11 in the axial direction of forward/backward member 11.

Figure 7:
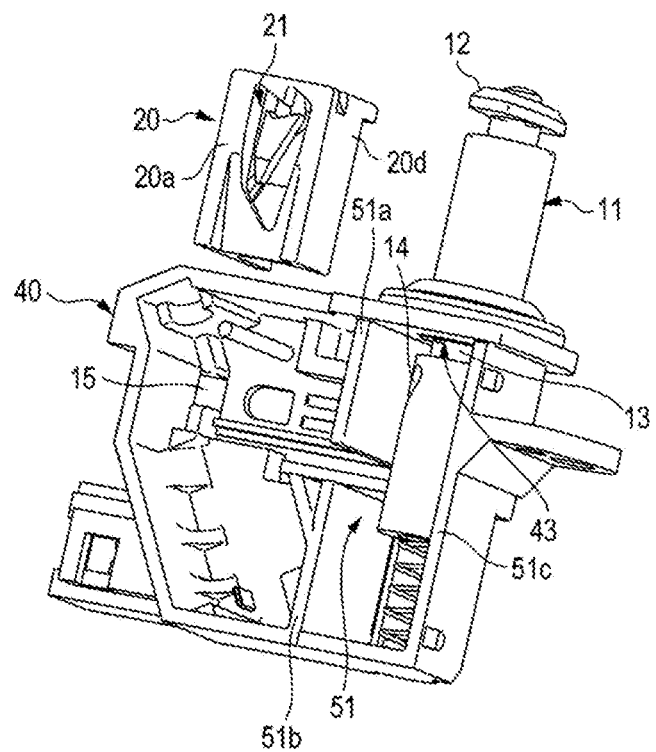
FIG. 7 is a perspective view in which a forward/backward-member-side member is separated from a main body in the forward/backward movement device according to the embodiment of the present invention.

Specifically, forward/backward-member-side member 20 fits into forward/backward member 11 such that they are rotatable relatively to each other. Forward/backward-member-side member 20 includes first plate-shaped section 20a which extends horizontally along the axis of forward/backward member 11 and has guiding section 21, and second plate-shaped section 20b which extends from first plate-shaped section 20a in the direction perpendicular to the axis of forward/backward member 11, as illustrated in FIG. 7 and/or the like.

Figure 8:
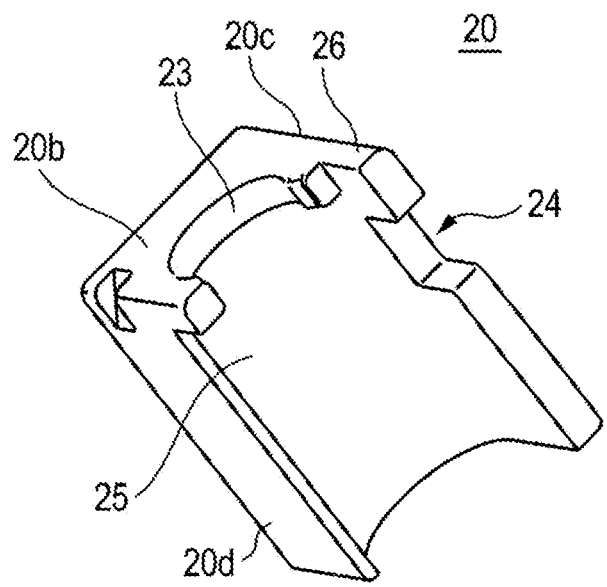
FIG. 8 is a rear perspective view of the forward/backward-member-side member.

Second plate-shaped section 20b has C-letter-shaped fitting section 23, and fitting section 23 fits into annular groove 13 in forward/backward member 11, as illustrated in FIG. 8. Second plate-shaped section 20b therefore slides along annular groove 13 in the direction about the axis of forward/backward member 11, but the movement of second plate-shaped section 20b and forward/backward member 11 relatively to each other in the axial direction of forward/backward member 11 and in the direction perpendicular to the axial direction is regulated. Therefore, forward/backward member 11 and forward/backward-member-side member 20 are rotatable relatively to each other in the rotational direction around the axis of forward/backward member 11, and the movement of forward/backward member 11 and forward/backward-member-side member 20 relatively to each other in the axial direction of forward/backward member 11 is not allowed.

Further, forward/backward-member-side member 20 is provided with third plate-shaped section 20c such that third plate-shaped section 20c intersect first plate-shaped section 20a and second plate-shaped section 20b at right angles, and is provided with fourth plate-shaped section 20d such that fourth plate-shaped section 20d intersect first plate-shaped section 20a and second plate-shaped section 20b at right angles and faces third plate-shaped section 20c. When fitting section 23 is fit into annular groove 13, forward/backward-member-side member 20 is attached onto forward/backward member 11 such that first plate-shaped section 20a, third plate-shaped section 20c, and fourth plate-shaped section 20d surround forward/backward member 11 in the circumferential direction. Forward/backward-member-side member 20 has curved surface 25 of a shape that follows the outer surface of the rod part of forward/backward member 11. Forward/backward-member-side member 20 and forward/backward member 11 rotate relatively to each other with curved surface 25 following the outer surface of the rod part of forward/backward member 11. As a result, looseness-free rotation is obtained. Fitting section 23 is disposed on the forward-direction side of forward/backward-member-side member 20 in the forward/backward direction of forward/backward member 11. In other words, the position of second plate-shaped section 20b having fitting section 23 in the forward/backward-member-side member 20 may be any position as long as the position allows second plate-shaped section 20b to come into contact with the inner peripheral wall surface around through hole 43 in case 40 when forward/backward-member-side member 20 moves in accordance with the forward movement of forward/backward member 11.

The fitting structure of forward/backward member 11 and forward/backward-member-side member 20 may be any structure as long as the two members are rotatable relatively about the axis of forward/backward member 11. For example, forward/backward member 11 may be provided with an annular protrusion, and forward/backward-member-side member 20 may be provided with an annular groove into which the annular protrusion fits. The annular protrusion may be replaced with a plurality of protrusions. Forward/backward-member-side member 20 and forward/backward member 11 are not particularly limited to have specific shapes as long as the specific shapes allow them to fit with each other in such a way that forward/backward-member-side member 20 moves when forward/backward member 11 moves forward and backward in the axial direction thereof, and that, when the movement of forward/backward-member-side member 20 is restricted, the movement of forward/backward member 11 is also restricted and forward/backward member 11 rotates relatively to forward/backward-member-side member 20. The fitting section of forward/backward-member-side member 20 is readily attached to the fit section of forward/backward member 11 when one of the fitting section and the fit section has an annular shape.

Third plate-shaped section 20c of forward/backward-member-side member 20 includes overhanging portion 26, which is formed such that a part of third plate-shaped section 20c overhangs. Forward/backward-member-side member 20 is held in case 40 with overhanging portion 26 being slidable against second holding section 51 of case 40. Second holding section 51 linearly extends in parallel to the forward/backward direction of forward/backward member 11, and when forward/backward member 11 moves in the forward/backward direction, overhanging portion 26 moves along second holding section 51. Since second holding section 51 is formed so as to be laterally surrounded by wall bodies 51a to 51c, second holding section 51 can also suppress rotation of forward/backward-member-side member 20. Overhanging portion 26 is provided at the leading end of third plate-shaped section 20c in an extension direction from first plate-shaped section 20a. However, the position of overhanging portion 26 and the position where overhanging portion 26 is in contact with case 40 are not particularly limited as long as the position of forward/backward-member-side member 20 is stable in the forward/backward movement of forward/backward member 11. Further, fourth plate-shaped section 20d of forward/backward-member-side member 20 may slide against the inner wall of case 40, and thus, forward/backward-member-side member 20 has a stable position when it moves in accordance with the forward/backward movement of forward/backward member 11.

Overhanging portion 26 is provided with an engaging section that engages with restriction member 30 to restrict the movement of forward/backward-member-side member 20 in the direction of the center axis of forward/backward member 11. An example of the engaging section is recess portion 24 where extension portion 31 (see FIG. 9) of restriction member 30 enters, and recess portion 24 is provided at a part of overhanging portion 26. Note that, recess portion 24 allows the forward/backward length of forward/backward member 11 restricted by extension portion 31 of restriction member 30 to be changed in accordance with the position of a backward-direction-side separating surface of overhanging portion 26, which is the surface that separates recess portion 24 from overhanging portion 26 in the axial direction. In the present embodiment, recess portion 24 is provided in a position where extension portion 31 is inserted into recess portion 24 when forward/backward member 11 is located in the backward position.

Further, first plate-shaped section 20a of forward/backward-member-side member 20 includes guiding section 21, which is formed of protrusions and recessions formed on the surface of the plate-shaped member, as illustrated in FIG. 7. Guiding section 21 guides forward/backward-member-side member 20. Plate-shaped guiding section 21 regulates a relative movement operation of the case-side member and forward/backward-member-side member 20.

Pin 82, which is an example of the case-side member, is provided in a predetermined position with respect to case 40. In more detail, pin 82 is provided so as to have a portion (curved portion 82a, herein, which will be described later) whose relative position to case 40 does not change.

Figure 5:
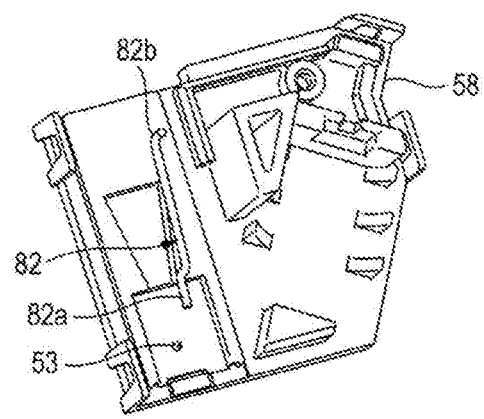
FIG. 5 is a perspective view illustrating the rear surface of the cover in the forward/backward movement device according to the embodiment of the present invention.

Pin 82 has curved portions 82a and 82b at both ends. Curved portion 82a at one end (base end) fits into fitting hole 53 (see FIG. 5) in cover 58. Curved portion 82b at the other end (leading end) is an example of a guided section to be guided by guiding section 21 of forward/backward-member-side member 20. Pin 82 may have elasticity as long as it has rigidity that can control the forward/backward movement of forward/backward member 11. Pin 82 is disposed such that one end fits into fitting hole 53 such that a side of the one end is pressed against guiding section 21. With this configuration, a state is set in which curved portion 82b at the leading end of pin 82 is pressed against guiding section 21 of forward/backward-member-side member 20, and thus, pin 82 is fixed turnably about fitting hole 53 in case 40.

Guiding section 21 of forward/backward-member-side member 20 is a so-called heart cam, and includes a circumferentially extending recess portion in the surface of the plate-shaped portion. Guiding section 21 guides curved portion 82b of pin 82 along the circumferentially extending recess portion. The bottom of the circumferentially extending recess portion is provided with a step, and curved portion 82b of pin 82 is guided in a descending direction along the step. Thus, curved portion 82b of pin 82 is guided so as to go around in one direction along the circumferentially extending recess portion of guiding section 21. When curved portion 82b of pin 82 is in a backward-side position in the circumferentially extending recess portion of guiding section 21, forward/backward member 11 is located in the forward position where forward/backward member 11 moves forward out of case 40. When curved portion 82b of pin 82 is in a forward-side position in the circumferentially extending recess portion of guiding section 21, that is, when curved portion 82b engages with V-shaped portion 21a, which is a valley portion at the center of an letter "M" shape, forward/backward member 11 is located in the backward position, where forward/backward member 11 moves backward into case 40. The position of curved portion 82b of pin 82 that is the backward-side position in the circumferentially extending recess portion of guiding section 21 corresponds to an example of a first position. The position of curved portion 82b of pin 82 that is the forward-side position in the circumferentially extending recess portion of guiding section 21 corresponds to an example of a second position. As described above, the guided section is guided to the first position or the second position in guiding section 21, and thus forward/backward member 11 moves to the forward position or the backward position.

The circumferentially extending recess portion of guiding section 21 has a path portion curved in a letter "M" shape on the forward side in the forward/backward direction of forward/backward member 11. When curved portion 82b of pin 82 is guided by the path portion such that forward/backward member 11 once moves backward almost to the end, forward/backward member 11 slightly moves forward and temporarily stops there. Curved portion 82b of pin 82 at this point is located in V-shaped portion 21a, which is the valley portion of the letter "M" shape. When forward/backward member 11 is caused to move backward almost to the end again, curved portion 82b of pin 82 disengages from V-shaped portion 21a and moves out thereof, and forward/backward member 11 moves forward to the forward position, accordingly.

As described above, guiding section 21 and curved portion 82b, which is an example of the guided section, play a role of regulating the relative movement operation of forward/backward-member-side member 20 and pin 82, which is an example of the case-side member in the forward/backward position control mechanism which controls the forward/backward movement of forward/backward member 11.

Note that, the motion of forward/backward member 11 in the backward direction is caused by external force, and the motion of forward/backward member 11 in the forward direction is caused by the energizing force of spring 81.

The configuration of the forward/backward position control mechanism which controls the forward/backward movement of forward/backward member 11 is not limited to the configuration described above. For example, guiding section 21 may be fixed to case 40, and forward/backward member 11 may be provided with a guided section to be guided by guiding section 21. In the case where guiding section 21 is fixed to case 40, pin 82 guided by guiding section 21 is provided on a side of forward/backward member 11. Further, one of the case-side member and the forward/backward-member-side member may include a guided section, while the other may include a guiding section.

[Restriction Member 30]

Restriction member 30 sets the restricted state in which the movement of forward/backward member 11, which is movable in the axial direction, is restricted in the forward/backward direction (axial direction, herein), as illustrated in FIGS. 4, 9, and 12A to 12C and/or the like. Restriction member 30 is provided so as to be movable between a restricted position where forward/backward member 11 is in the restricted state and a released position where the restricted state is released.

In the present embodiment, restriction member 30 engages with forward/backward-member-side member 20 when forward/backward member 11 is located in the restricted position to set forward/backward member 11 to be in the restricted state. In the present embodiment, the restricted position is the same position as the backward position where forward/backward member 11 is held by the forward/backward position control mechanism, as an example. Therefore, when forward/backward member 11 is located in the backward position by the forward/backward position control mechanism, restriction member 30 set forward/backward member 11 to be in the restricted state, and restricts movement to the forward position by the forward/backward position control mechanism. Note that, the restricted position may not be the backward position where forward/backward member 11 is held by the forward/backward position control mechanism, and a configuration may be employed, which restricts, in the middle of movement of forward/backward member 11 from the backward position to the forward position, the movement of forward/backward member 11 until the latched state between latching section 12 and latched section 104 is released. The restricted state in which the forward/backward movement is restricted is representatively a state in which the movement in the forward direction and the movement in the backward direction are both restricted, as will be described later. Meanwhile, as a variation, the restricted state may be a state in which only one of the movement in the forward direction and the movement in the backward direction is restricted.

Figure 9:
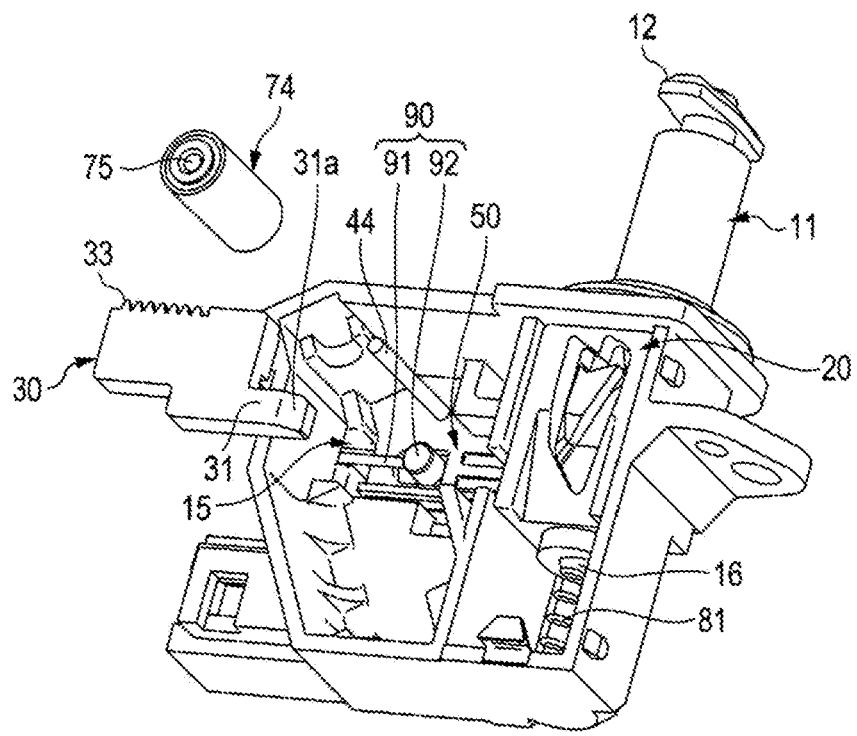
FIG. 9 is a perspective view in which a restriction member and a worm are separated from the main body in the forward/backward movement device according to the embodiment of the present invention.
Figure 10:
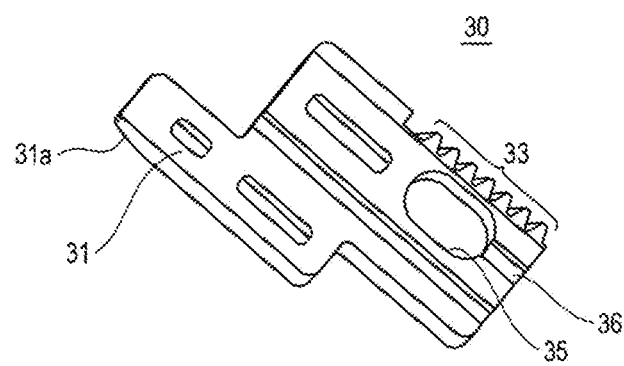
FIG. 10 is a rear perspective view of the restriction member.

In the present embodiment, restriction member 30 includes: extension portion 31, which extends from a main body section of forward/backward movement device 1 in a direction that intersects the forward/backward direction of forward/backward member 11; and rack 33 for converting rotational motion into linear motion, as illustrated in FIG. 9 and FIG. 10.

Restriction member 30 is slidably held by third holding section 50 of case 40. Third holding section 50 linearly extends in the extending direction of extension portion 31 and allows restriction member 30 to slide in the extending direction.

Rack 33 is disposed so as to extend in the extending direction of extension portion 31, engages with worm 74, and follows the rotational motion of worm 74 to cause restriction member 30 to move in the extending direction thereof.

When forward/backward member 11 is located in the backward position, and restriction member 30 moves by a predetermined amount or greater, extension portion 31 of restriction member 30 enters recess portion 24 of forward/backward-member-side member 20 and engages with recess portion 24, which is the engaging section, to set the restricted state, in which the forward/backward movement of forward/backward member 11 is restricted. The front end of extension portion 31 has front end portion 31a having a tapered shape for easier insertion into recess portion 24.

The position of restriction member 30 in FIG. 4 is the releasing position where the restricted state of forward/backward member 11 is released. When restriction member 30 is located in the releasing position, forward/backward member 11 can move forward and backward. FIG. 4 illustrates a state in which forward/backward member 11 has fully moved in the forward direction.

The configuration that sets forward/backward member 11 to be in the restricted state is not limited to the configuration in which extension portion 31 of restriction member 30 enters recess portion 24 of forward/backward-member-side member 20, and a variety of engaging structures may be applied. For example, a configuration may be employed in which forward/backward member 11 is provided with a protruding portion, and restriction member 30 is be provided with a recess portion, and when restriction member 30 is located in the restricted position, the recess portion engages with the protruding portion to set forward/backward member 11 to be in the restricted state.

Cable 90 which slides restriction member 30 from the outside of the device is connected to restriction member 30. How cable 90 is attached to restriction member 30 is not limited, but in order to allow effective slide movement of restriction member 30 by using cable 90, it is desirable to attach cable 90 to restriction member 30 such that cable 90 is led out in a slide direction of restriction member 30. In this case, it is possible to forcibly move restriction member 30 from the restricted position to the releasing position by pulling cable 90.

In the present embodiment, as illustrated in FIG. 10, a connection section that connects one end of cable 90 is formed of guide recess portion 35 and lead-out section 36, which extends to guide recess portion 35 in restriction member 30. Cable end 92 at the one end of cable 90 engages with guide recess portion 35 (see FIG. 12). Cable main body 91 connected to cable end 92 is lead out to the outside of restriction member 30 through groove-shaped lead-out section 36, which communicates with guide recess portion 35 and opens to the exterior of restriction member 30. In the present embodiment, guide recess portion 35 is formed so as to extend in the slide direction of restriction member 30. Thus, the interior of guide recess portion 35 is provided with allowance that allows cable end 92 to slide. In a case where the length of guide recess portion 35 in the slide direction is equal to or longer than the movement range of restriction member 30, when restriction member 30 is caused to slide by the driving force of drive section 60 to be described later from the releasing position to the restricted position, movement of cable end 92 following the sliding movement and an increase in the tension of cable main body 91 can be suppressed, and thus, resistance that restriction member 30 may receive from cable 90 while restriction member 30 is moving can be suppressed.

[Drive Section 60]

Drive section 60 generates a driving force that moves restriction member 30. Drive section 60 includes drive shaft 64 and drive section main body 62, which rotates drive shaft 64. In the present embodiment, a motor is applied as drive section 60. That is, in the present embodiment, drive section main body 62 is a motor main body, and drive shaft 64 is the output shaft of the motor. Drive section 60 is held by drive-section main-body holding section 45 and provided on the side where the forward/backward position control mechanism is provided with respect to restriction member 30 and forward/backward member 11. Providing drive section 60 on the side where the forward/backward position control mechanism is provided with respect to restriction member 30 and forward/backward member 11 means that an imaginary plane which is located in case 40 and where restriction member 30 and forward/backward member 11 are disposed is assumed and drive section 60 is disposed on the same side as the side where the forward/backward position control mechanism is disposed with respect to the imaginary plane. Specifically, drive section 60 is disposed on or above the bottom surface of a bottom portion of case 40 that is the surface on which restriction member 30 and forward/backward member 11 are disposed via each holding section. In other words, an imaginary layer containing drive section 60 and the forward/backward position control mechanism is disposed on or above an imaginary layer containing restriction member 30 and forward/backward member 11 so as to overlap with the imaginary layer. In the present embodiment, in case 40, drive section 60 is disposed on or above restriction member 30 so as to overlap therewith with respect to restriction member 30 and forward/backward member 11 laterally adjacent to each other, and the forward/backward position control mechanism laterally adjacent to drive section 60 is disposed on or above forward/backward member 11.

Drive shaft 64, which protrudes from drive section main body 62, is disposed so as to extend in a direction including, as a direction component, the direction in which forward/backward member 11 extends. Drive section 60, which is held by drive-section main-body holding section 45, is disposed so as to incline with respect to forward/backward member 11 such that drive shaft 64 is more distant from forward/backward member 11 than drive section main body 62 is. Drive section main body 62 and drive shaft 64 are disposed in a direction that is not perpendicular to but intersects the axis of forward/backward member 11. The above-mentioned configuration in which one end of drive shaft 64 is more distant from forward/backward member 11 than the other end of drive shaft 64 is secures the space for disposing driving-force transmission member 70 which transmits the driving force from the one end of drive shaft 64 to restriction member 30.

[Driving-Force Transmission Member 70]

Driving-force transmission member 70 is connected to the one end of drive shaft 64 and transmits the driving force of drive section 60, that is, a rotational force of drive shaft 64 to restriction member 30 to move restriction member 30. In the present embodiment, the one end of drive shaft 64 protrudes from drive section main body 62, and the other end of drive shaft 64 is housed in drive section main body 62. Driving-force transmission member 70 is connected to the one end of drive shaft 64, but the arrangement relationship of drive shaft 64 and drive section main body 62 is not limited to the configuration described above. In short, the function of transmitting the driving force generated by drive section 60 to restriction member 30 only needs to be provided.

In the present embodiment, the motion direction of drive section 60 is the direction about the axis of drive shaft 64, whereas the movement direction of restriction member 30 in which restriction member 30 moves to the restricted position and releasing position is the direction in which restriction member 30 slides in an extending direction of restriction member 30. Therefore, in the present embodiment, driving-force transmission member 70 has the function of transmitting a force acting in the rotational direction, as a force acting in the linear direction. In the present embodiment, driving-force transmission member 70 includes worm gear 72 connected to drive shaft 64, and worm 74 connected to worm gear 72 and rack 33. The force generated by drive section 60 and acting in the rotational direction can thus be transmitted as the force acting in the linear direction to restriction member 30.

Figure 11:
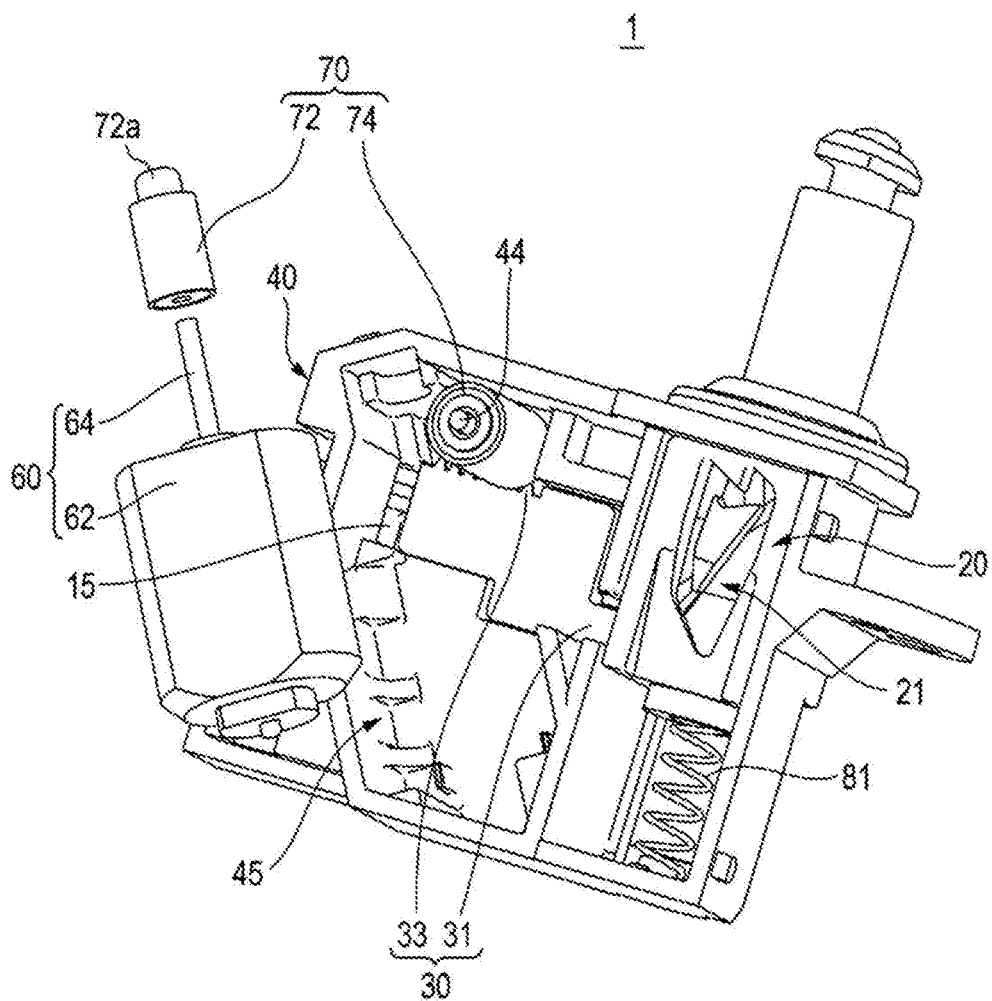
FIG. 11 is a perspective view in which a motor and a worm gear are separated from the main body in the forward/backward movement device according to the embodiment of the present invention.

Specifically, worm gear 72 and drive section 60 are fixed to each other such that worm gear 72 is rotated by driving of drive section 60, as illustrated in FIG. 4 and FIG. 11.

Shaft section 72a of worm gear 72 is supported by bearing 46 of case 40. Rotating worm gear 72 comes in mesh with worm 74 and causes worm 74 to rotate by the rotation of worm gear 72. In the drawings illustrating worm 74, the teeth provided along the outer circumference of worm 74 are omitted.

In the present embodiment, driving-force transmission member 70 is configured of worm gear 72 connected to one end of drive shaft 64, and worm 74, as an example, but driving-force transmission member 70 may be configured in any other ways as long as driving-force transmission member 70 can transmit the rotational motion of drive shaft 64 to restriction member 30. A configuration may be employed in which a worm is attached to drive shaft 64 of drive section 60, and the worm that rotates along with drive shaft 64 comes directly in mesh with rack 33 of restriction member 30 to allow restriction member 30 to slide. Moreover, a configuration may be employed in which a plurality of worm gears is disposed between drive shaft 64 and restriction member 30, and the driving force of drive shaft 64 is transmitted to restriction member 30 via the plurality of worm gears. Further, a configuration may be employed in which, in a case where restriction member 30 makes a movement other than sliding, the driving force of drive shaft 64 can be transmitted in a form suitable for the movement of restriction member 30.

Worm 74 is rotatably supported by spindle 44 of case 40, as illustrated in FIG. 9 and FIG. 11. Spindle 44 passes through shaft hole 75 of worm 74 such that worm 74 is rotatable about spindle 44. Worm 74 comes not only in mesh with worm gear 72 but also comes in mesh with rack 33 of restriction member 30. When worm 74 rotates on rack 33, worm 74 transmits motion to restriction member 30 via rack 33. Restriction member 30 thus slides in the extending direction of rack 33. The movement of restriction member 30 herein is regulated by third holding section 50, and restriction member 30 slides along third holding section 50.

In the present embodiment, driving-force transmission member 70 is configured to transmit power from drive shaft 64 of drive section 60 to restriction member 30 by causing worm 74 to come in mesh with each of worm gear 72 attached to drive shaft 64, and rack 33 of restriction member 30. Therefore, when drive section 60 is not driven, rotation of drive section 60 is restrained by driving-force transmission member 70 via drive shaft 64. The rotation of drive shaft 64 about the axis thereof can thus be regulated with no need to provide a lock mechanism that restricts the rotation of drive shaft 64 to drive section 60, itself.

[Cable 90]

Cable 90 allows movement of restriction member 30 via cable 90 operated from outside of forward/backward movement device 1 without driving of drive section 60.

Cable 90 has one end linked to restriction member 30 and is led outside through lead-out hole 15 formed in case 40. An operation to pull the other end of cable 90 causes restriction member 30 to move from the restricted position to the releasing position, and thus, the restricted state is released.

As cable 90, a control cable is applied, for example. A control cable is generally formed of an inner cable and an outer cable that slidably houses the inner cable. Cable 90 in the present embodiment is, however, formed only of an inner cable with no outer cables.

Specifically, cable 90 has cable end 92 which is larger than the outer shape of cable main body 91, and which is located at one end of cable main body 91 being an inner cable.

Cable end 92 of cable 90 is disposed in guide recess portion 35 of restriction member 30, and cable main body 91 which extends from cable end 92 is led to the outside of restriction member 30 via lead-out section 36. Cable main body 91 which is led to the outside of restriction member 30 is led to the outside of forward/backward movement device 1 via lead-out hole 15 of case 40.

[Cover 58]

Cover 58 covers the opening of case 40 and surrounds one side of a plurality of parts housed in case 40, and holds the plurality of parts such that the plurality of parts perform a predetermined motion, as illustrated in FIG. 3. Cover 58 is provided with fitting hole 53 (see FIG. 5), and curved portion 82*a* of pin 82 fits into fitting hole 53.

[Operation of Forward/Backward Movement Device 1]

Figure 12A:
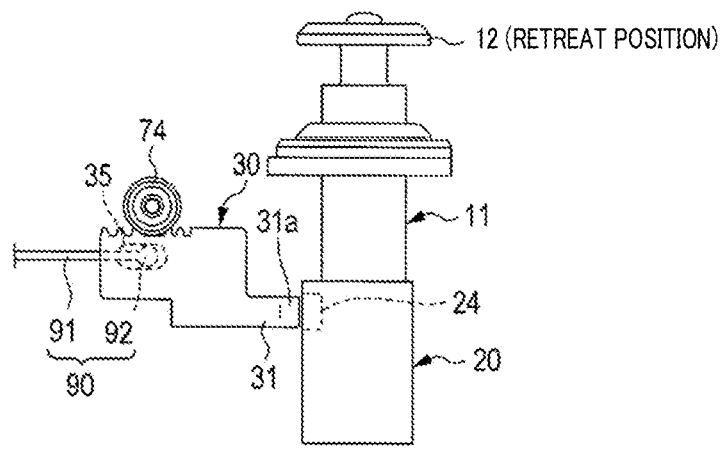
FIGS. 12A, 12B, and 12C are views which schematically illustrate the operation of the forward/backward movement device according to the embodiment of the present invention.
Figure 12B:
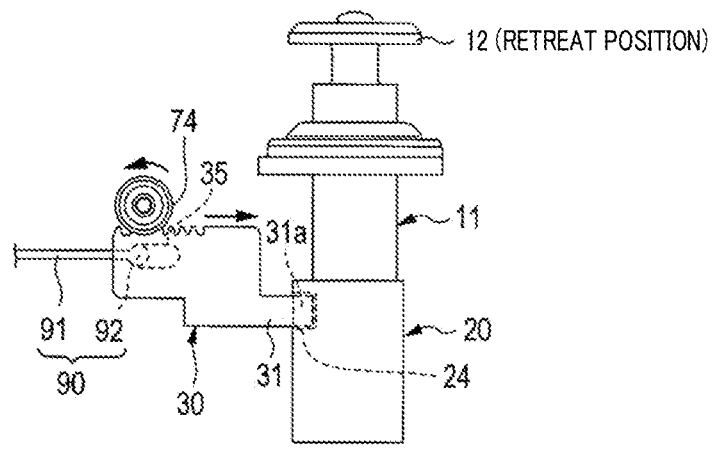
Figure 12C:
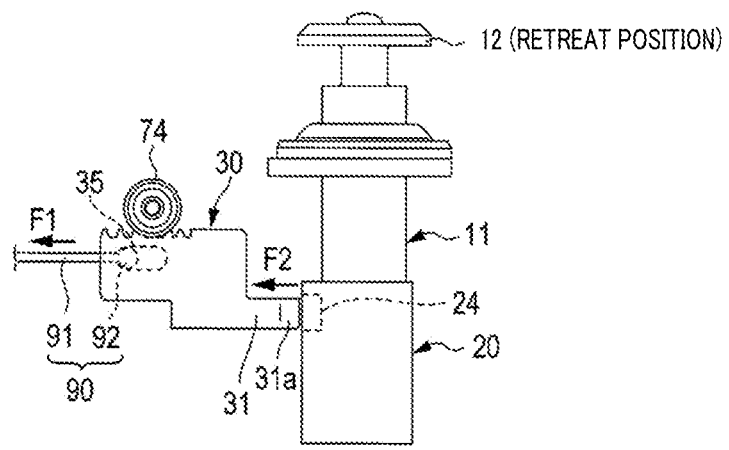

The operation of forward/backward movement device 1 will be described with reference primarily to FIGS. 12A to 12C. FIG. 12A illustrates a state in which the forward/backward member is located in the backward position and the restriction member is located in the releasing position. FIG. 12B illustrates a state in which the restriction member is located in the restricted position. FIG. 12C illustrates a state in which the restriction member is located in the releasing position by cable operation.

In forward/backward movement device 1 configured as described above, first of all, when forward/backward member 11 is located in the forward position, latching section 12 is oriented in the direction in which the latched state of latched section 104 of fuel lid 101 is released, as indicated by the solid-line position of latching section 12 in FIG. 4. Further, restriction member 30 is disposed in the releasing position via worm 74 by control of drive section 60. At this point, forward/backward member 11 receives a repulsive force of spring 81 via forward/backward-member-side member 20 and is therefore energized in the forward direction. Curved portion 82*b* of pin 82 is located on a backward side on a circumferentially extending path of guiding section 21 and restricts further forward movement of forward/backward member 11.

In this state, when an external force in the backward direction acts on forward/backward member 11, forward/backward member 11 moves backward.

Protrusion 42 on case 40 guides helical groove 14 in forward/backward member 11 such that the trajectory of the movement of forward/backward member 11, for example, rotation of the leading end of forward/backward member 11 occurs during the backward movement, and forward/backward member 11 moves to the backward position. Forward/backward member 11 thus rotates in the rotational direction about the axial core thereof.

When forward/backward member 11 is moved to the backward position by the external force, curved portion 82*b* of pin 82 is located on a forward side on the circumferentially extending path of guiding section 21 and temporarily holds forward/backward member 11 such that forward/backward member 11 does not move forward (see FIG. 12A). Specifically, pin 82 fits into V-shaped portion 21*a* of guiding section 21. Latching section 12 of forward/backward member 11 is oriented in the direction in which latching section 12 latches latched section 104 of fuel lid 101.

In the state in which forward/backward member 11 has moved backward, when worm 74 rotates by control of drive section 60, restriction member 30 moves to the restricted position and restricts the slide movement of forward/backward-member-side member 20, as illustrated in FIG. 12B. The forward/backward movement of forward/backward member 11 is thus restricted.

In the state in which forward/backward member 11 has moved backward, when worm 74 rotates in a reverse direction by control of drive section 60, restriction member 30 moves to the releasing position and releases the restriction of the slide movement of forward/backward-member-side member 20, and the restriction of the forward/backward movement of forward/backward member 11 is also released.

The restriction of the forward and backward movement of forward/backward member 11 can be released by operation of cable 90. That is, to move restriction member 30 to the releasing position, cable 90 is pulled from outside in direction F1 illustrated in FIG. 12C without driving of drive section 60.

When cable 90 is pulled from the outside of forward/backward movement device 1, in restriction member 30, cable end 92 moves in guide recess portion 35 in direction F2, in which cable end 92 moves away from forward/backward member 11. Direction F2 is the same direction as direction F1. Cable end 92 engages with an end surface where lead-out section 36 is provided in guide recess portion 35, and moves restriction member 30, itself, in direction F2. Restriction member 30 then moves in the direction of moving away from forward/backward-member-side member 20 against the restraining force generated by worm gear 72 on drive shaft 64 and worm 74 in mesh with each other. Extension portion 31 of restriction member 30 separates from recess portion 24 of forward/backward member 11, and the engagement between extension portion 31 and recess portion 24 is released. As described above, the restriction of the forward and backward movement of forward/backward member 11 by restriction member 30 is released from the outside of forward/backward movement device 1 by operation of cable 90.

In the state in which the restriction of the forward and backward movement of forward/backward member 11 is released, when an external force in the backward direction is added to forward/backward member 11, curved portion 82b of pin 82 moves along the circumferentially extending path of guiding section 21 to the path portion where curved portion 82b is guided from the forward side toward the backward side. When the external force on forward/backward member 11 is removed, forward/backward-member-side member 20 slidingly moves by the repulsive force of spring 81, and thus, forward/backward member 11 moves forward to the forward position.

[Effects of Forward/Backward Movement Device 1]

In forward/backward movement device 1 according to the present embodiment, the forward/backward position control mechanism and drive section 60 are disposed on the same side with respect to forward/backward member 11 and restriction member 30. That is, the forward/backward position control mechanism and drive section 60 are each disposed so as to overlap with the imaginary plane formed by forward/backward member 11 and restriction member 30. The forward/backward position control mechanism, drive section 60, forward/backward member 11, and restriction member 30 can therefore be disposed in a compact space, and thus, the width in the perpendicular direction with respect to forward/backward member 11 can be reduced. Further, since inclination is made in a direction intersecting with the axial direction of forward/backward member 11 for drive shaft 64 of drive section 60, the protruding length in the axial direction can be shortened by the amount corresponding to the inclination. Moreover, movement of restriction member 30 can be reliably performed, and thus, restriction of forward/backward member 11 by movement of restriction member 30 can be readily performed. Thus, forward/backward movement device 1 reduced in size can be obtained.

Further, cable 90 to be led to the outside of forward/backward movement device 1 is connected to restriction member 30. Thus, in a case where drive section 60 cannot be used at the time of trouble, for example, restriction member 30 is moved by operation of cable 90 without control of drive section 60, and thus, the restricted state of the forward and backward movement of forward/backward member 11 can be released. Note that, when the leading out direction of cable 90 is set to be the engagement direction of front end portion 31a of extension portion 31 to recess portion 24, forward/backward member 11 can be set into the restricted by operation of cable 90 without control of drive section 60.

Further, forward/backward-member-side member 20 includes guiding section 21 which controls the forward and backward movement of forward/backward member 11. Thus, even with the configuration in which forward/backward member 11 moves forward and backward while rotating, a structure that controls the forward and backward movement of forward/backward member 11 can be readily provided.

Further, in the present embodiment, the configuration is employed in which restriction member 30 is moved by operation of cable 90 connected to restriction member 30. However, as long as restriction member 30 can be slidingly moved without control of drive section 60, the configuration is not limited to the configuration described, herein.

For example, when cable 90 itself is set movable in the extending direction with no bending, restriction member 30 is moved by operation of cable 90, for example, pushing or pulling cable 90 toward or away from a side of case 40, and thus, restriction of the forward and backward movement of forward/backward member 11 and releasing of the restriction can be performed. Specifically, a configuration may be employed in which cable 90 is formed of a rod-shape body and connected to restriction member 30, and restriction member 30 is moved by movement of the rod-shaped body in the extending direction, and thus, restriction of the forward and backward movement of forward/backward member 11 and release of the restriction are performed. Moreover, instead of cable 90, an actuator may be provided, which directly activates drive shaft 64 or a driving-force transmission member, such as worm gear 72 and worm 74, through operation performed from outside of forward/backward movement device 1, and the actuator is configured to activate the drive shaft 64 or the driving-force transmission member without control of drive section 60. For example, a gear or a rack that comes in mesh with one of worm gear 72 and worm 74 and further comes in mesh with the other and is driven by an external operation may be provided as the actuator, and the gear or the rack may be activated as appropriate from the outside of forward/backward movement device 1.

The present invention is not limited to the embodiment described above and can be changed in various ways. For example, in the embodiment described above, the configuration in which the restriction member rectilinearly moves has been presented as an example. However, a configuration in which the restriction member that makes circular motion and engages with the forward/backward-member-side member may be employed.

INDUSTRIAL APPLICABILITY

The fuel lid opening/closing apparatus has been presented as the opening/closing apparatus by way of example. However, the forward/backward movement device according to the present invention can similarly be applied in a variety of flap-type opening/closing apparatuses. Further, the forward/backward movement device may be incorporated into a variety of devices without being limited to the opening/closing apparatus.

REFERENCE SIGNS LIST

1 Forward/backward movement device
11 Forward/backward member
12 Latching section
13 Annular groove
14 Helical groove
15 Lead-out hole
16 Spring insertion hole
20 Forward/backward-member-side member
21 Guiding section
21a V-shaped portion
23 Fitting section
24 Recess portion
25 Curved surface 26 Overhanging portion
30 Restriction member
31 Extension portion
31a Leading end portion
33 Rack
35 Guide recess portion
36 Lead-out section
40 Case
41 First holding section
42 Protrusion
43 Through hole
44 Spindle
45 Drive-section main-body holding section
46 Bearing
47 Spring holding shaft
50 Third holding section
51 Second holding section
53 Fitting hole
58 Cover
60 Drive section
62 Drive section main body
64 Drive shaft
70 Driving-force transmission member
72 Worm gear
74 Worm
75 Shaft hole
81 Spring
82 Pin
82a, 82b Curved portion
90 Cable
91 Cable main body
92 Cable end
100 Opening/closing apparatus
101 Fuel lid
104 Latched section
F1, F2 Direction

The invention claimed is:

1. A forward/backward movement device, comprising:
a case;
a forward/backward member capable of moving forward and backward with respect to the case;
a forward/backward position control mechanism that performs control such that the forward/backward member moves forward to a forward position where the forward/backward member moves forward with respect to the case and moves backward to a backward position where the forward/backward member moves backward with respect to the case;
a restriction member that causes the forward/backward member to be in a restricted state in which the forward and backward movement is restricted;
a drive section including a drive shaft and a main body that rotates the drive shaft; and
a driving-force transmission member that is connected to one end of the drive shaft and transmits a driving force of the drive section to the restriction member to move the restriction member, wherein
the forward/backward member is provided in the case so as to move forward and backward while rotating relatively with respect to the case,
the forward/backward position control mechanism includes a case-side member which is provided in a predetermined position with respect to the case and a forward/backward-member-side member which is provided in the forward/backward member so as to fit to the forward/backward member such that the forward/backward-member-side member is rotatable relatively with respect to the forward/backward member,
the restriction member is provided so as to be movable to a restricted position where the restriction member causes the forward/backward member to be in the restricted state and to a releasing position where the restricted state is released, the restriction member causing the forward/backward member to be in the restricted state by engaging with the forward/backward-member-side member in the restricted position,
the drive section is provided on a side identical to a side where the forward/backward position control mechanism is provided with respect to the restriction member and the forward/backward member,
the drive shaft extends in a direction including, as a direction component, a direction in which the forward/backward member extends,
the forward/backward position control mechanism includes a plate-shaped guiding section and a guided section, the plate-shaped guiding section being configured to regulate a relative movement operation of the case-side member and the forward/backward-member-side member, the guided section being a section to be guided by the plate-shaped guiding section,
the forward/backward member is moved to the forward position and the backward position when the guided section is guided to a first position and a second position in the plate-shaped guiding section, and
any one of the case-side member and the forward/backward-member-side member includes the guided section, and the other one of the case-side member and the forward/backward-member-side member includes the plate-shaped guiding section.

2. The forward/backward movement device according to claim 1, wherein any one of the case and the forward/backward member includes a trajectory guiding section that guides a movement trajectory of the forward/backward member such that the forward/backward member moves forward and backward while rotating relatively with respect to the case, and the other one of the case and the forward/backward movement member includes a trajectory guided section that is guided by the trajectory guiding section.

3. The forward/backward movement device according to claim 1, further comprising a control cable that has one end linked to the restriction member and is led to an outside of the case,
wherein the restriction member is moved from the restricted position to the releasing position by operating the control cable, and the restricted state is thus released.

* * * * *